United States Patent Office 2,967,441
Patented Jan. 10, 1961

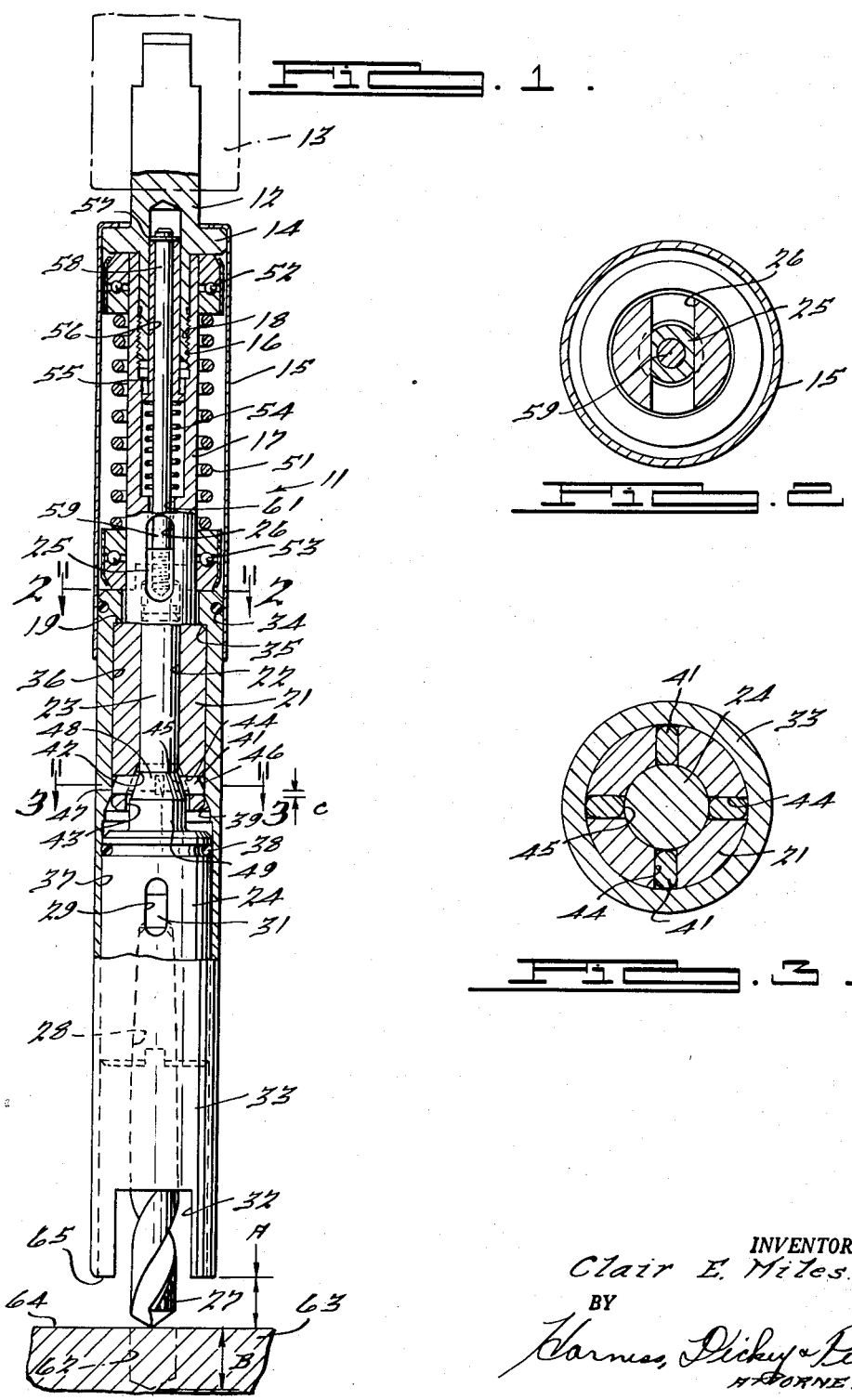

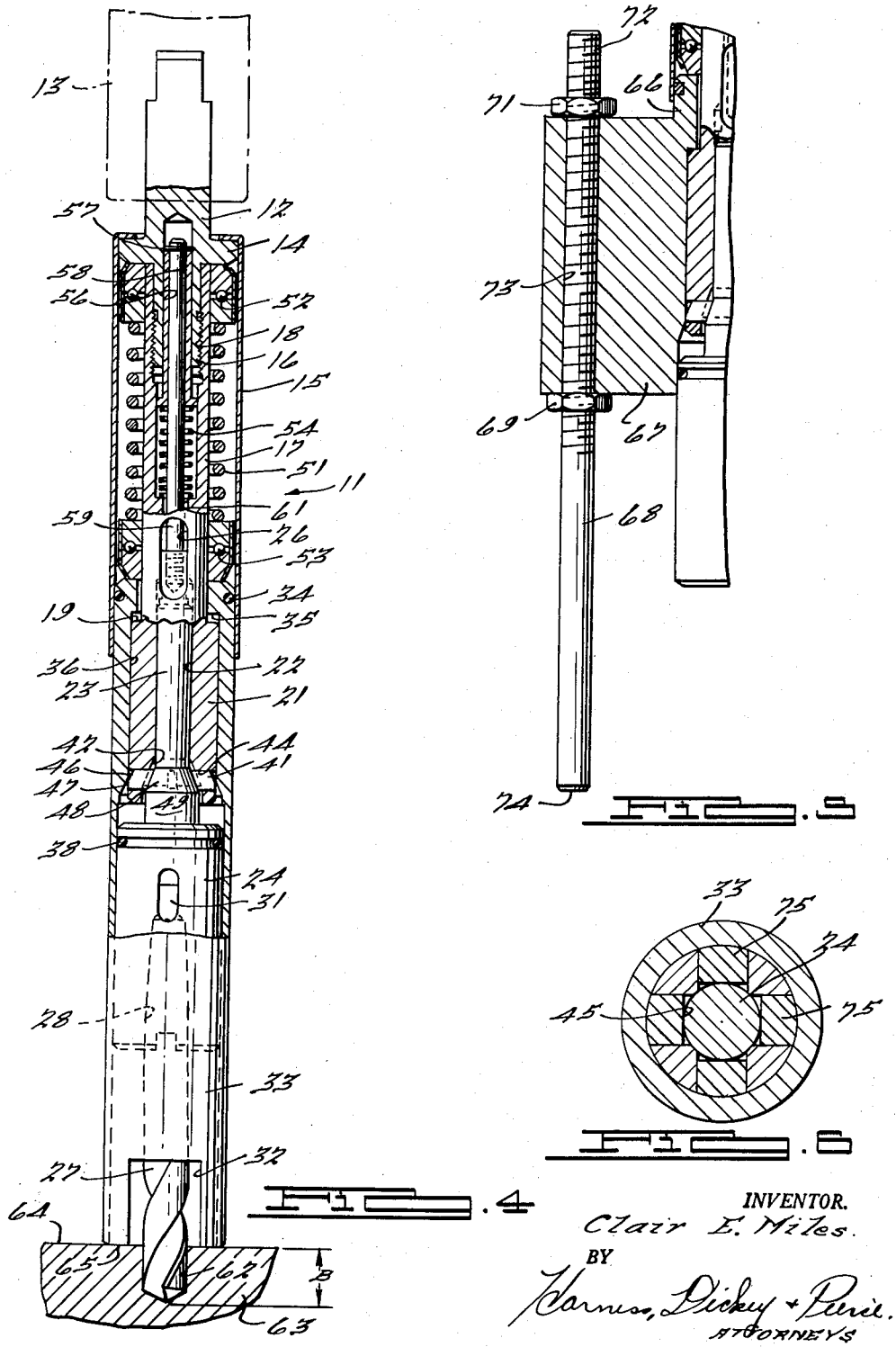

2,967,441

DEVICE FOR CONTROLLING THE DEPTH OF ENTRANCE OF CUTTING TOOLS

Clair E. Miles, 22504 Bayview, St. Clair Shores, Mich.

Filed Dec. 31, 1959, Ser. No. 863,207

11 Claims. (Cl. 77—55)

This invention relates to cutting tools, and more particularly to devices for controlling the depth of entrance of cutting tools into the work.

It is an object of the invention to provide a novel and improved device capable of use with drill presses or other machine tools and which will automatically remove the force urging the tool into the workpiece when the proper tool depth has been reached, so that no cutting can take place beyond the desired depth regardless of continued rotation of the cutting tool.

It is another object to provide an improved cutting tool control mechanism of this nature which is adapted to measure the depth of a cut with reference to a surface of the workpiece being cut, thus obviating the possibility of errors due to variations between workpieces.

It is also an object to provide an improved tool controlling device having the above characteristics, which is positive in its action, is of relatively simple and foolproof construction, and will not interfere with other components of a machine tool.

It is a further object, in one embodiment of the invention, to provide a cutting tool control device of this character which includes means for preselecting the depth of cut with a minimum of effort or difficulty.

The foregoing and other objects and advantages of the present invention wil become apparent in the following detailed description of a preferred embodiment thereof, taken in conjunction wtih the drawing wherein:

Figure 1 is a side elevational view in cross-section showing a preferred embodiment of the invention in its starting position;

Figure 2 is a cross-sectional view taken along the line 2—2 of Figure 1 and showing the rotary driving connection between the drive shaft and tool holder;

Figure 3 is a cross-sectional view taken along the line 3—3 of Figure 1 and showing the locations of the driving keys;

Figure 4 is a fragmentary view similar to Figure 1 showing the parts in their idling position after the full cutting depth has been reached;

Figure 5 is a fragmentary side elevational view showing a modified form of the depth control member; and Figure 6 is a cross-sectional view similar to Figure 3 but showing a modified key construction.

In general terms, the invention comprises a drive shaft adapted to be connected to a drill press spindle or to a similar machine tool, a tool holder coaxial with the drive shaft, and a rotary driving connection between the drive shaft and tool holder. The means for moving the tool holder axially in response to axial movement of the drive shaft comprises a plurality of keys mounted for radial sliding movement in the drive shaft and having inner surfaces engageable with a frustoconical surface on the tool holder. A depth control member in the form of a sleeve surrounds the parts and has an inner surface engageable with the keys to hold them against the frustoconical tool holder surface so that axial drive shaft movement will move the tool correspondingly. The depth control sleeve is enageable with a reference surface, for example on the workpiece, when the proper cutting depth has been reached, so that further axial movement of the drive shaft will carry the keys past the above-mentioned inner surface of the depth control member. This surface flares to a wider diameter surface, thus permitting the keys to slide past the frustoconical tool holder surface. The result will be that further axial movement of the drive shaft will not be capable of causing axial tool holder movement, and the tool will thus rotate idly without cutting beyond the desired depth.

Referring more particularly to the drawings, the control device is generally indicated at 11 and comprises an adapter 12 capable of being received by the spindle of a drill press, shown in dot-dash lines at 13. It will be understood that the device could be adapted for connection to other machine tools within the principles of the invention. Adapter 12 has an intermediate shoulder 14 to which is secured an annular dust cover 15, and an externally threaded portion 16 extends below shoulder 14. A drive shaft 17 having a partially internally threaded bore 18 is threaded onto portion 16 of adapter 12 and has an upper end engaging the underside of shoulder 14. A shoulder 19 is formed on an intermediate portion of drive shaft 17, the portion 21 of the drive shaft below shoulder 19 having a wider diameter than the upper drive shaft portion. A bore 22 extends upwardly through drive shaft portion 21 and is adapted to receive the upper extension 23 of a tool holder 24. The upper flattened end 25 of tool holder 24 is disposed within a radially extending slot 26 in drive shaft 17 about shoulder 19, so that rotary movement of the drive shaft will cause rotary movement of tool holder 24. Tool holder 24 is axially slidable within bore 22 and slot 26 for purposes which will appear below. The lower portion of tool holder 24 is adapted to hold a tool such as a drill bit 27 by means of a tapered bore 28 and a slot 29 receiving end 31 of the tool. Recesses 32 in a depth control sleeve 33 surrounding bit 27 provide chip clearance for the work.

Depth control sleeve 33 surrounds tool holder 24 and lower portion 21 of drive shaft 17. This sleeve has an upper gasket 34 engageable with the inner surface of dust cover 15, and internally extending shoulder 35 engageable with shoulder 19 of the drive shaft. Sleeve 33 has an upper bore 36 in slidable contact with the outer surface of drive shaft portion 21, and a somewhat larger bore 37, tool holder 24 having a gasket 38 in contact with the surface 37. A frusto-conical surface 39 connects bores 36 and 37 of sleeve 33.

A plurality of keys 41 are mounted for radial sliding movement within the lower portion of drive shaft section 21. For this purpose, the drive shaft has a frusto-conical surface 42 flaring downwardly and outwardly from bore 22, with a short bore 43 of larger diameter than bore 22 extending downwardly from the lower end of surface 42. A plurality of radially extending slots 44 connect surface 42 with the outer surface of drive shaft section 21, and keys 41 are slidable in these slots. Four keys are shown in the illustrated embodiment, each key having horizontal upper and lower edges, a downwardly and outwardly inclined inner edge 45, and an outer edge having a downwardly and outwardly inclined upper portion 46 and an axially extending lower portion 47.

The lower portion of tool holder extension 23 has a downwardly and outwardly flared surface 48 disposed within the space surrounded by drive shaft surface 42. The lower edge of surface 48 is connected with a cylindrical surface 49 on the tool holder extending downwardly toward the main portion of this member. The angularities of surfaces 42 and 48 are substantially the same, as are the angularities of sleeve surface 39 and edge portions 45 and 46 of keys 41. The relative dimensions of the various surfaces are such that when edge portions 47 of keys 41 are in contact with bore 36 of sleeve 33, edges 45 of the keys will be held in contact with surface 48 of the tool holder. Downward axial movement of drive shaft 21 will thus cause a downward axial force to be transmitted through keys 41 and surface 48 to the holder.

Means are provided for urging the parts toward the position shown in Figure 1, this means including a helical compression spring 51 surrounding the upper portion of drive shaft 17. The upper end of this spring is connected with shoulder 14 through a thrust bearing 52 while the lower end is connected with the upper end of sleeve 33 by a bearing 53. Spring 51 will thus urge shoulder 19 of drive shaft 17 against shoulder 35 of sleeve 33. A smaller and lighter helical compression spring 54 is disposed within bore 18 of drive shaft 17. The lower end of spring 54 is urged against the bottom of bore 18 while the upper end is engageable with the lower end of a cylindrical spacer 55 disposed within a bore 56 in adapter 12. The upper end of spacer 55 engageable with a ring 57 carried by the upper end of a pin 58, this pin extending downwardly through spacer 55 and the lower end 59 being threaded into the top of tool holder extension 25. Spring 54 will thus urge tool holder 24 upwardly with respect to drive shaft 17. A clearance bore 61 is provided in drive shaft 17 between bore 18 and slot 26 for accommodating pin 58.

In operation, assuming an initial position of the parts as shown in Figure 1, let it be required to drill a hole indicated by dot-dash lines at 62 in a workpiece 63 having a surface 64 which may be termed the reference surface. When a rotary force and downward pressure are applied to drill press spindle 13, the rotary force will be transmitted from adapter 12 by means of threaded portion 16 to drive shaft 17, and from the drive shaft through slot 26 and tool holder extension 25 to the tool holder. Drill bit 27 will thus be rotated. Since keys 41 are confined within surface 36 of sleeve 33, the downward force on drive shaft 17 exerted by shoulder 14 of adapter 12 will be transmitted by key edges 45 to tool holder surface 48, causing tool 27 to be forced downwardly against the work. As the tool enters the work, tool holder 24 and drive shaft 17 will move downwardly, and sleeve 33 will also move downwardly due to the force exerted on it from drive shaft shoulder 14 through spring 51. This movement will continue until the lower end 65 of sleeve 33 engages reference surface 64, as seen in Figure 4. The original distance A set between reference surface 64 and end 65 will be the desired depth B of the hole less the distance C shown in Figure 1, which keys 41 must travel before their edge portions 46 begin to make contact with internal sleeve surface 39.

When sleeve end 65 contacts reference surface 64, the hole will have been drilled to a depth equal to distance A. Further downward movement of drive shaft 17 and tool holder 24, together with tool 27, will result in compression of spring 51, sleeve 33 remaining stationary. When this movement has continued for a distance equal to that indicated at C, edge portions 46 of keys 41 will make contact with sleeve surface 39. Further downward movement of drive shaft 17 will result in radially outward shifting of keys 41 as guided by surfaces 48 and 39, but without the keys exerting any axial force on tool holder 24. The latter will thus continue to rotate idly, a tool depth of $B=A+C$ having been reached. Downward movement of drive shaft 17 with respect to tool holder 24 will result in expansion of spring 54, the spring thus serving to maintain proper positioning of the keys relative to their associated surfaces.

Upon upward retraction of spindle 13, drive shaft 17 will move upwardly, sleeve 33 being held in contact with workpiece 63 by spring 51. The inward camming action of surface 39 on keys 41 will be such that tool holder 24 will likewise be held in its lower position, thus causing compression of spring 54. When edge portions 47 of keys 41 reach surface 36 of sleeve 33, tool holder 24 will begin to move upwardly along with drive shaft 17, spring 54 holding these parts in a predetermined relation. When shoulder 19 of drive shaft 17 reaches shoulder 35 of sleeve 33, the sleeve will be carried upwardly away from the workpiece along with the other parts, withdrawing tool 27 from hole 62 as shown in Figure 1.

Figure 5 shows a modified form of the invention according to which the sleeve member, indicated at 66, is shortened, and is provided with a widened portion 67 having an adjustable rod 68 secured thereto by nuts 69 and 71. These nuts are carried by a threaded portion 72 of rod 68 extending through a bore 73 in sleeve portion 67. The lower end 74 of rod 68 may thus be used to contact the reference work surface, and since the vertical position of rod 68 may be adjusted, the depth of the hole may be preselected.

Figure 6 shows a modified form of keys, indicated at 75 in this figure, which is analogous to Figure 3. It has been found that the relatively wider horizontal section of keys 75, as compared with keys 41, contribute to manufacturing convenience. A vertical section of keys 75 would appear identical with keys 41 as seen in Figures 1 and 4.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a device for controlling the depth of entrance of a cutting tool, a drive shaft member adapted to be subjected to rotary and axial forces, a tool holder member slidably and non-rotatably connected to said drive shaft member, a key supported for movement by one of said members between an axial force transmitting position and an inoperative position with respect to the other member, a depth control member mounted for movement relative to said drive shaft member, resilient means responsive to axial movement of said drive shaft member in one direction to urge said depth control member in one direction, said resilient means being yieldable in response to restraint of said depth control member, and a surface on said depth control member movable in response to such restraint from a first position holding said key in its force transmitting position to a second position permitting said key to move to its inoperative position.

2. In a device for controlling the depth of entrance of a cutting tool, a drive shaft adapted to receive rotary and axial forces, a tool holder slidably and non-rotatably connected to said drive shaft, a key supported for radial movement by said drive shaft, complementary surfaces on said key and tool holder capable of transmitting an axial force from said drive shaft to said tool holder, a depth control member axially movable with respect to said drive shaft, and a surface on said depth control member movable in response to axial movement of said depth control member relative to said drive shaft from a first position maintaining said key and tool holder surfaces in operative relation to a second position permitting said key to be withdrawn from such operative relation, whereby axial movement of said drive shaft relative to said tool holder will be permitted.

3. In a device for controlling the depth of entrance of a cutting tool, a drive shaft adapted to receive rotational and axial forces, a tool holder non-rotatably connected to said drive shaft, an inclined surface on said tool holder, a key carried by said drive shaft and having an inclined surface engageable with said tool holder surface, said key being movable radially between an operative position in which an axial force on said drive shaft in one direction will be transmitted to said tool holder and an inoperative position in which said key is withdrawn from said tool holder surface, a depth control member movable axially with respect to said drive shaft, yieldable means urging said depth control member in said one direction, and a surface on said depth control member engageable with said key to maintain the key in its operative position, said surface being retractable from said key engagement in response to axial movement of said depth control member relative to said drive shaft, whereby said key will be cammed outwardly by said inclined tool holder surface in response to a further axial force on said drive shaft.

4. In a device for controlling the depth of entrance of a cutting tool, a drive shaft adapted to receive rotational and axial forces, a tool holder non-rotatably connected to said drive shaft, a depth control sleeve surrounding said drive shaft and tool holder, a key mounted for radial movement in said drive shaft, inclined surfaces on said tool holder and key, the key being movable between an inner position in which said inclined surfaces are in engagement whereby an axial force on said drive shaft in one direction will be transmitted to said tool holder, and an outer position, a first cylindrical surface on said sleeve engageable with said key to maintain the key in its first position, an inclined surface on said sleeve, and a second inclined surface on said key engageable with said inclined sleeve surface in response to a predetermined relative axial movement between the sleeve and drive shaft, whereby said key will be cammed outwardly by said inclined tool holder surface in response to a further axial force exerted on said drive shaft.

5. In a device for controlling the depth of entrance of a cutting tool, a drive shaft adapted to receive axial and rotary forces, a tool holder slidably and non-rotatably connected to said drive shaft, a depth control sleeve surrounding said drive shaft and tool holder, a spring connecting said drive shaft and sleeve and urging the sleeve axially in the direction of advance of said drive shaft, means on the sleeve and drive shaft defining a limiting position of the sleeve, a plurality of circumferentially spaced keys carried by said drive shaft, a frustoconical surface on said tool holder, inclined surfaces on said keys, the keys being movable radially from an operative position in which said inclined surfaces are in engagement with said frustoconical tool holder surface and an inoperative position, a cylindrical internal surface on said sleeve engageable with said keys to maintain the keys in their operative position when said sleeve is in its limiting position, and a frustoconical surface on said sleeve engageable with said keys in response to axial movement of said sleeve relative to said drive shaft, whereby continued further axial force applied to said drive shaft will cause said keys to move to their inoperative position with respect to said tool holder surface.

6. The combination according to claim 5, further provided with a spring connecting said drive shaft and tool holder and urging said tool holder in a direction opposite to the direction of advance of said drive shaft.

7. The combination according to claim 5, further provided with a depth selector rod secured to said depth control sleeve in parallel relation with the sleeve axis, and means for securing said rod in axially adjusted positions with respect to said sleeve.

8. In a device for controlling the depth of entrance of a cutting tool, a drive shaft adapted to receive rotational and axial forces, a tool holder slidably and non-rotatably connected to said drive shaft, a plurality of circumferentially spaced keys slidably mounted in said drive shaft for radial movement, said keys each having an inner inclined surface, an outer inclined surface portion substantially parallel to the inner inclined surface, and an axially extending outer surface portion, a frustoconical surface on said tool holder engageable by said inner key surfaces, a depth control sleeve surrounding said drive shaft and tool holder and having an inner cylindrical surface and a frustoconical surface contiguous therewith, said frustoconical surface having substantially the same angularity as said tool holder surface, means defining a limiting axial position between said sleeve and drive shaft and permitting relative axial movement between the sleeve and drive shaft in one direction from said limiting position, and yieldable means urging said sleeve toward its limiting position, said cylindrical sleeve surface being engageable with said axially extending key surfaces in engagement with said tool holder surface, said outer inclined key surface portions being engageable with said frustoconical sleeve surface in response to movement of said sleeve away from its limiting position, whereby relative axial movement between said drive shaft and tool holder will be permitted.

9. In a device for controlling the depth of entrance of a cutting tool, a drive shaft adapted to receive rotary and axial forces, a bore within one portion of said drive shaft, a tool holder having a tool supporting portion and a cylindrical portion within said drive shaft bore, said tool holder being axially movable with respect to said drive shaft, means for preventing relative rotation between said drive shaft and tool holder, a frustoconical surface between the tool supporting portion of the tool holder and the portion within said drive shaft bore, a flared portion in said drive shaft bore for receiving said frustoconical tool holder surface, a plurality of keys supported for radial movement by said drive shaft adjacent said flared portion, the inner portions of said keys being engageable with said frustoconical tool holder surface, a sleeve surrounding said drive shaft and tool holder, an inner cylindrical surface on said sleeve engageable with the outer portions of said keys to maintain the keys in operative engagement with said frustoconical tool holder surface, a frustoconical internal surface in said sleeve, means defining a limiting axial position between said drive shaft and sleeve, and means permitting relative axial movement between said drive shaft and sleeve, whereby said frustoconical sleeve surface will come into engagement with the outer portions of said keys.

10. The combination according to claim 9, further provided with a pin secured to the portion of said tool holder within said drive shaft bore and coaxial therewith, and a spring connecting said drive shaft and pin and urging said frustoconical tool holder surface against said keys.

11. The combination according to claim 10, further provided with a second spring connecting said drive shaft and sleeve and urging the sleeve toward said limiting position.

References Cited in the file of this patent
UNITED STATES PATENTS

| | | |
|---|---|---|
| 974,239 | Dalton | Nov. 1, 1910 |
| 1,057,132 | Einicher | Mar. 25, 1913 |